Oct. 28, 1952 E. BERNER 2,615,525
SOUND ABSORBING BOARD WITH HOLES
CONTAINING DEBRIS MATERIAL
Filed July 29, 1947
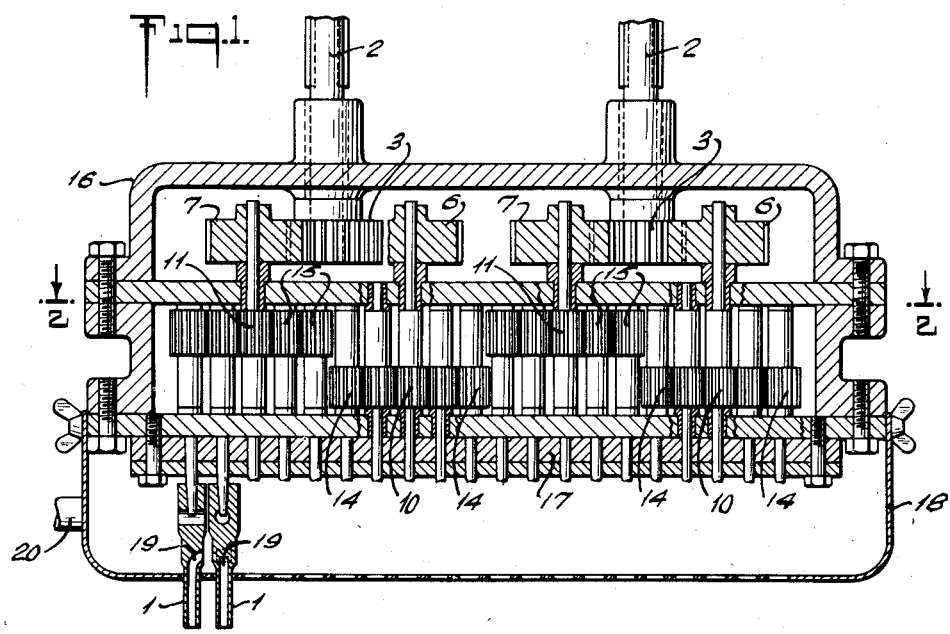
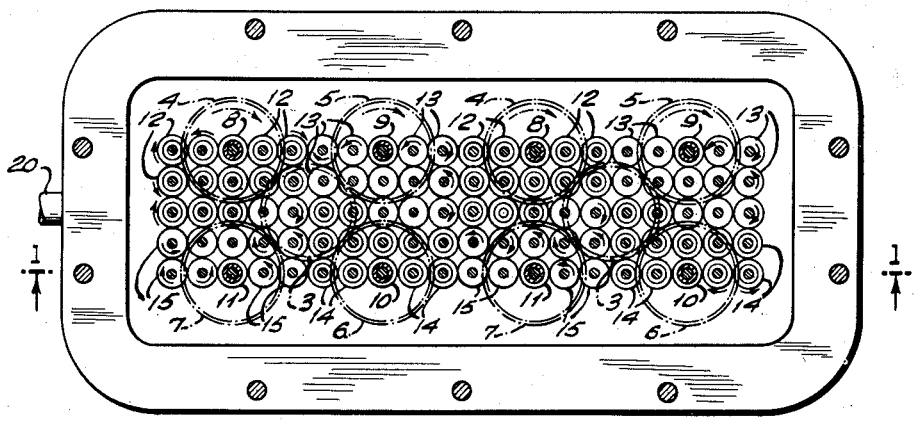
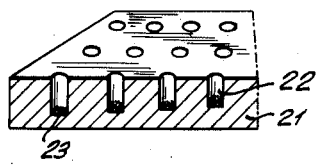

Patented Oct. 28, 1952

2,615,525

UNITED STATES PATENT OFFICE 2,615,525

SOUND-ABSORBING BOARD WITH HOLES CONTAINING DEBRIS MATERIAL

Erling Berner, Gothenburg, Sweden

Application July 29, 1947, Serial No. 764,457
In Sweden November 13, 1942

Section 1, Public Law 690, August 8, 1946
Patent expires November 13, 1962

4 Claims. (Cl. 181—33)

This invention relates to sound absorbing boards of fibrous material, such as wood, pulp or the like. Such boards, provided with holes bored from one side of the board to a depth leaving a bottom at the inner end thereof are extensively used as a material for covering walls and ceilings in localities where it is desired to shorten the time of reverberation, to lower the sound level or otherwise to control the acoustic conditions.

Hitherto, the holes of the boards are made with the aid of ordinary twist drills. These drills involve great difficulties, however, particularly on account of the high speed at which the drills are to be operated when working in the fibrous material, generally at a rate of about 7000–10,000 revolutions per minute. This entails construction problems difficult to solve in the manufacture of drill heads having a plurality of drills for the drilling of a great number of holes at the same time. Furthermore, fibrous materials cause a very rapid wear of the drill material, so that the drills have to be changed frequently.

One object of my invention is to avoid the difficulties and drawbacks pertaining to the known constructions. One feature of the invention is the method of making the holes in the fibrous material with the aid of rotating core borers in the form of hollow cylinders. Such borers need not be operated at a rate higher than approximately 1000 revolutions per minute at the most, which of course simplifies the construction of the boring-machines to a considerable extent. Furthermore, the borers are not worn out nearly so rapidly as are the previously used drills, a considerable saving of drill material being thus also obtained.

It is favourable from the point of view of sound absorption to fill the holes in the boards partially with a material having elastic properties other than those of the remainder of the board, particularly in acoustical respects. A soft and elastic rubber composition might be mentioned by way of example. However, the method according to the invention also renders possible a partial filling of the holes in another and very simple manner. This may be done by not removing all of the material partly loosened in the holes through the boring work. The borers are in connection with a suction conduit or suction chamber. Now, if the sucking effect is not made very powerful, small cushions of loosened material of greater porosity than that of the board will remain automatically at the bottom of the bore holes, and in many instances even thin disks of the material of the board, which previously filled the holes, will remain in the latter. These cushions and disks, which constitute what may be termed chips or debris resulting from the boring operation, create the desired increased effect particularly by the fact that they are of random depth and in most instances fill the bottom portions of the holes to different and random extents.

I am aware that it is known to cut disks from sheets, such as of cork, by means of tubular cutters. Such disks are intended to be utilized as the lining for receptacle closures, for instance, and it is to be understood that in this case the object is to form the disks and not the holes. On the contrary, my invention is based on the discovery that the material of the sound absorbing board, contained within the tubular borer when penetrating into the board, loosens and is subdivided into small particles.

Further objects and advantages of the invention will be apparent from the following description considered in connection with the accompanying drawing, which forms a part of this specification, and of which:

Fig. 1 is a vertical sectional view, taken on the line 1—1 of Fig. 2, of a borer head of a machine adapted to carry the method into effect.

Fig. 2 is a plan view, partly sectioned along the line 2—2 of Fig. 1.

Fig. 3 is a perspective, and sectional view of a portion of a board made according to the invention.

The boring-machine shown in the drawing is intended for the boring of 100 holes at a time. However, of the borers 1, only two are shown in Fig. 1. The main shafts 2 of the boring head are driven, for instance, by means of belt transmissions from a common motor, not shown. Each main shaft 2 has a gear wheel 3 secured thereon, said gear wheel driving four gear wheels 4, 5, 6 and 7 arranged about said first gear wheel 3. Secured to each of the shafts of the gear wheels 4 to 7 is a gear wheel 8, 9, 10 and 11, respectively, as well as a borer 1. The latter gear wheels drive in turn gear wheels 12, 13, 14 and 15, respectively, either directly or through one or more of said last-mentioned gear wheels. They rotate, some of them in the one and others in the opposite direction and are arranged on their shafts at different levels, so that adjacent gear wheels of different groups, which rotate in different directions, do not engage one another. In Fig. 2, the various groups are indicated by full lines and dash-lines. The gear wheels within the full lines are at a higher level than those within the dash-lines, as shown in Fig. 1. In Fig. 2, the direction of rotation of some of the gear wheels is also indicated by arrows.

The shafts of the gear wheels 12—15 also have borers secured thereon, the same as the shafts of the gear wheels 4—7 and 8—11. All of the gear wheels are enclosed within a chamber 16, which is preferably filled with oil. Arranged about the shafts of the borers is a felt packing 17 to prevent oil from flowing down the shafts from the chamber 16. The borers 1 consist of hollow cylinders from special steel, and are preferably of a thickness so small that no special grinding of their end portions is called for. The borers extend through a hood 18 secured to the receptacle 16, said hood serving to collect the material loosened through the boring work. To this end, the interior of the hood 18 is preferably connected to a suction conduit 20. The loosened material is sucked out of the borers 1 through the openings 19. In order that the loosened material shall not stick within the borers, the latter is made with a smooth and uniform surface and with a smooth rounding at the opening 19. If desired, the inner diameter of the borers may increase in an upward direction toward the opening 19. A rotational speed of the borers of approximately 700 revolutions per minute has proved to give good results, but the speed will of course have to be adapted to the nature of the material in which the boring work is performed.

The board 21 illustrated in Fig. 3 has a plurality of bores 22 extending from the one face thereof to a suitable depth. 23 is the loosened board material which may remain in the hole, aiding to ensure high sound absorbing properties to the board. The various holes may be bored to different depths, a matter which also has a favourable effect on said properties.

The above example of the application of the method according to the invention is not intended to confine the invention to any details comprised in said example inasmuch as such details can be modified in various ways within the scope of the invention.

The method and apparatus herein disclosed and not claimed, forms the subject matter of my copending divisional application Serial No. 253,159, filed October 25, 1951.

What I claim is:

1. A sound absorbing board of fibrous material having a plurality of holes formed therein, said holes being of less depth than the thickness of the board and closed at their inner ends and different ones of said holes being of different depth, said holes being filled at least in part with debris loosened from the material of the board as the result of the hole forming operation and the depth of such debris material being different in different holes.

2. A sound absorbing board of fibrous material having a multiplicity of holes formed therein of less depth than the thickness of the board, the bottom portions of the holes containing debris material inclusive of disc-like chips separated from the material of the board as the result of a core-boring forming operation and retained in said bottom portions.

3. A board as set forth in claim 2 in which the debris material retained in the different holes is of random depth.

4. A board as set forth in claim 3 in which the different holes are of random length.

ERLING BERNER.

REFERENCES CITED

The following references are of record in the file of this patent:

UNITED STATES PATENTS

| Number | Name | Date |
|---|---|---|
| 118,806 | Lafferty | Sept. 12, 1871 |
| 865,249 | Jaquith | Sept. 3, 1907 |
| 1,234,467 | Hamilton | July 24, 1917 |
| 1,483,365 | Mazer | Feb. 12, 1924 |
| 1,554,180 | Trader | Sept. 15, 1925 |
| 1,705,778 | Munroe | Mar. 19, 1929 |
| 1,804,884 | Mazer | May 12, 1931 |
| 2,096,233 | Ericson | Oct. 19, 1937 |
| 2,215,273 | Paradis | Sept. 17, 1940 |
| 2,301,800 | Bersie | Nov. 10, 1942 |
| 2,412,713 | Burt | Dec. 17, 1946 |
| 2,413,568 | Hurley | Dec. 31, 1946 |